United States Patent [19]
Yeatts

[11] Patent Number: 5,549,428
[45] Date of Patent: Aug. 27, 1996

[54] TRUCK BED LINER ANTI-SKID DEVICE

[76] Inventor: Ben R. Yeatts, Rte. 2, Box 15-S.V., Paradise, Tex. 76073

[21] Appl. No.: 259,844

[22] Filed: Jun. 15, 1994

Related U.S. Application Data

[63] Continuation of Ser. No. 796,092, Nov. 20, 1991, abandoned, which is a continuation-in-part of Ser. No. 740,976, Aug. 6, 1991, abandoned.

[51] Int. Cl.$^6$ .............................. B60P 7/08; B60P 7/135
[52] U.S. Cl. .............................. 410/94; 410/90; 410/121
[58] Field of Search .................................... 410/117, 121, 410/130, 153, 156, 94, 104, 95, 102, 90, 80, 77; 428/167, 120, 172, 178; 296/39.2

[56] References Cited

U.S. PATENT DOCUMENTS

| | | | |
|---|---|---|---|
| 999,828 | 8/1911 | McNaughton | 410/94 |
| 1,559,827 | 11/1925 | Wittman | 410/94 X |
| 2,057,873 | 10/1936 | Atwood | 428/167 X |
| 2,810,672 | 10/1957 | Taylor | 428/167 X |
| 2,812,728 | 11/1957 | Reheis | 410/121 |
| 3,104,085 | 9/1963 | Skladony | 410/121 X |
| 3,508,764 | 4/1970 | Dobson et al. | 410/90 |
| 3,784,054 | 1/1974 | Mautz | 410/80 X |
| 3,861,541 | 1/1975 | Taft et al. | 410/90 X |
| 4,311,420 | 1/1982 | Hendricks et al. | 410/121 |
| 4,693,507 | 9/1987 | Dresen | 296/39.2 |
| 4,717,298 | 1/1988 | Bott | 410/94 X |
| 4,840,460 | 6/1989 | Schlesch | 410/121 |
| 4,958,876 | 9/1990 | Diaco et al. | 410/144 X |
| 5,131,709 | 7/1992 | Spiea | 296/392 |

FOREIGN PATENT DOCUMENTS

| | | | |
|---|---|---|---|
| 3738762 | 5/1989 | Germany | 428/167 |

OTHER PUBLICATIONS

Brochure, "Allstar", 11–90–300M, Part 080–3013, Durakon Industries.
Brochure, "The Big Mat Combo", Part 080–3185, Durakon Industries.

Primary Examiner—Karen Merritt
Assistant Examiner—Stephen Gordon
Attorney, Agent, or Firm—Dunlap & Codding, P.C.

[57] ABSTRACT

An anti-skid device adapted to be used with a truck bed liner, wherein the truck bed liner has a plurality of liner ribs forming a plurality of liner rib recesses. The anti-skid device is constructed of an anti-skid material. At least two device ribs are formed on the anti-skid device. The device ribs are sized so that the device ribs are disposed within the liner rib recesses when the anti-skid device in placed on the truck bed liner. A portion of cargo is disposed on the anti-skid device. The anti-skid device grippingly engages the cargo and the truck bed liner for substantially preventing movement of the cargo.

2 Claims, 4 Drawing Sheets

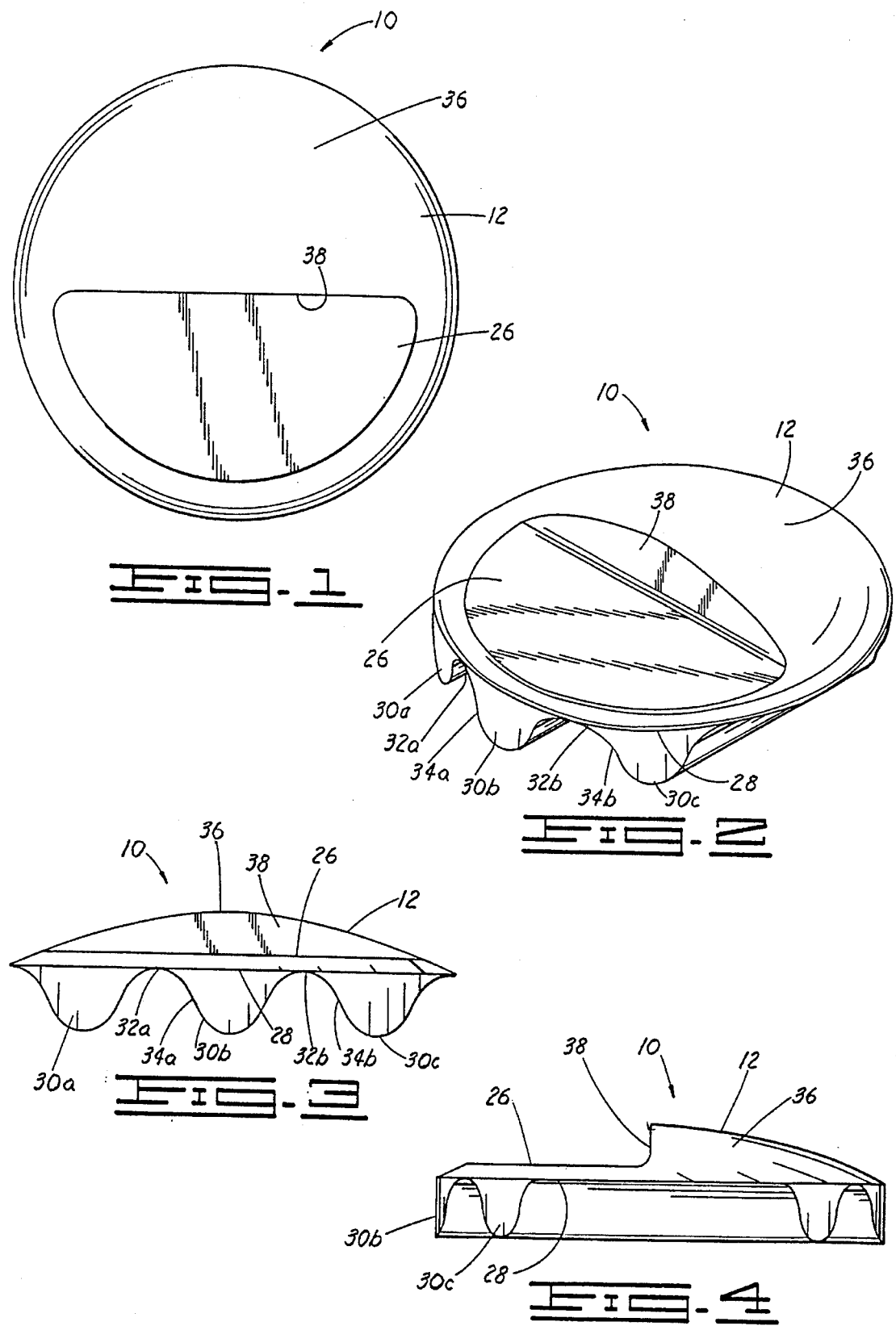

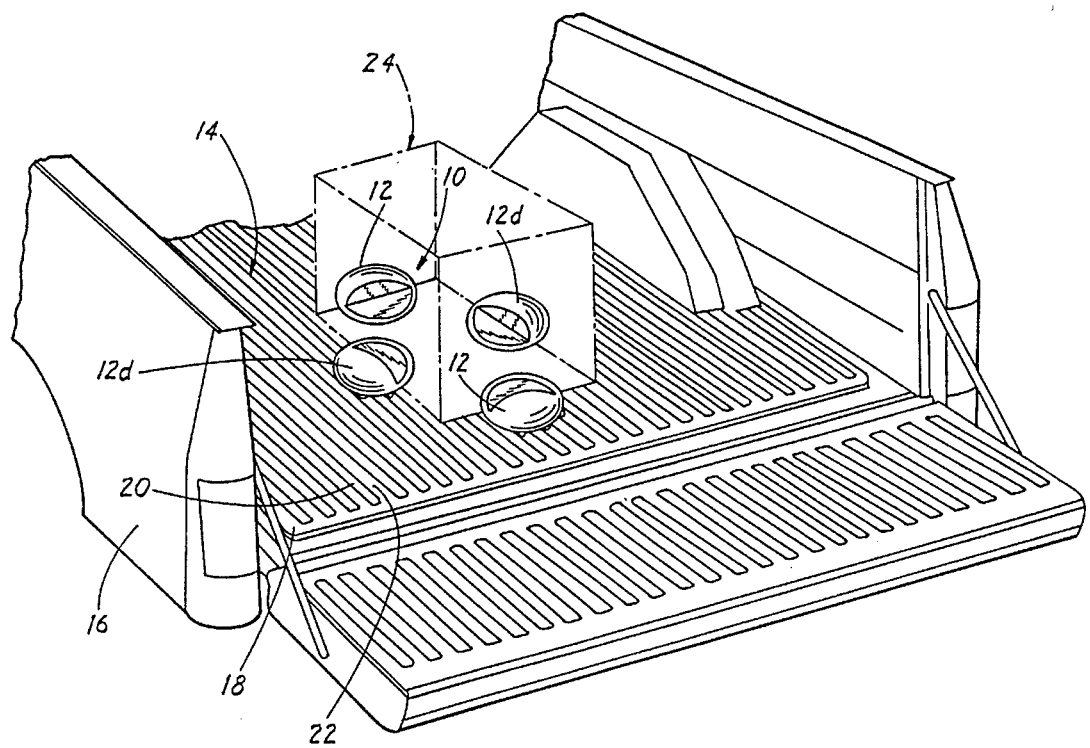
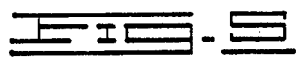
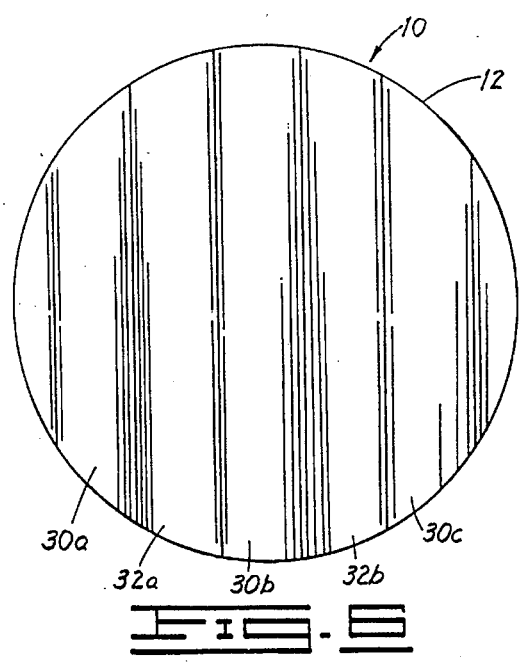
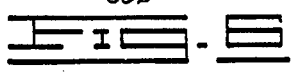

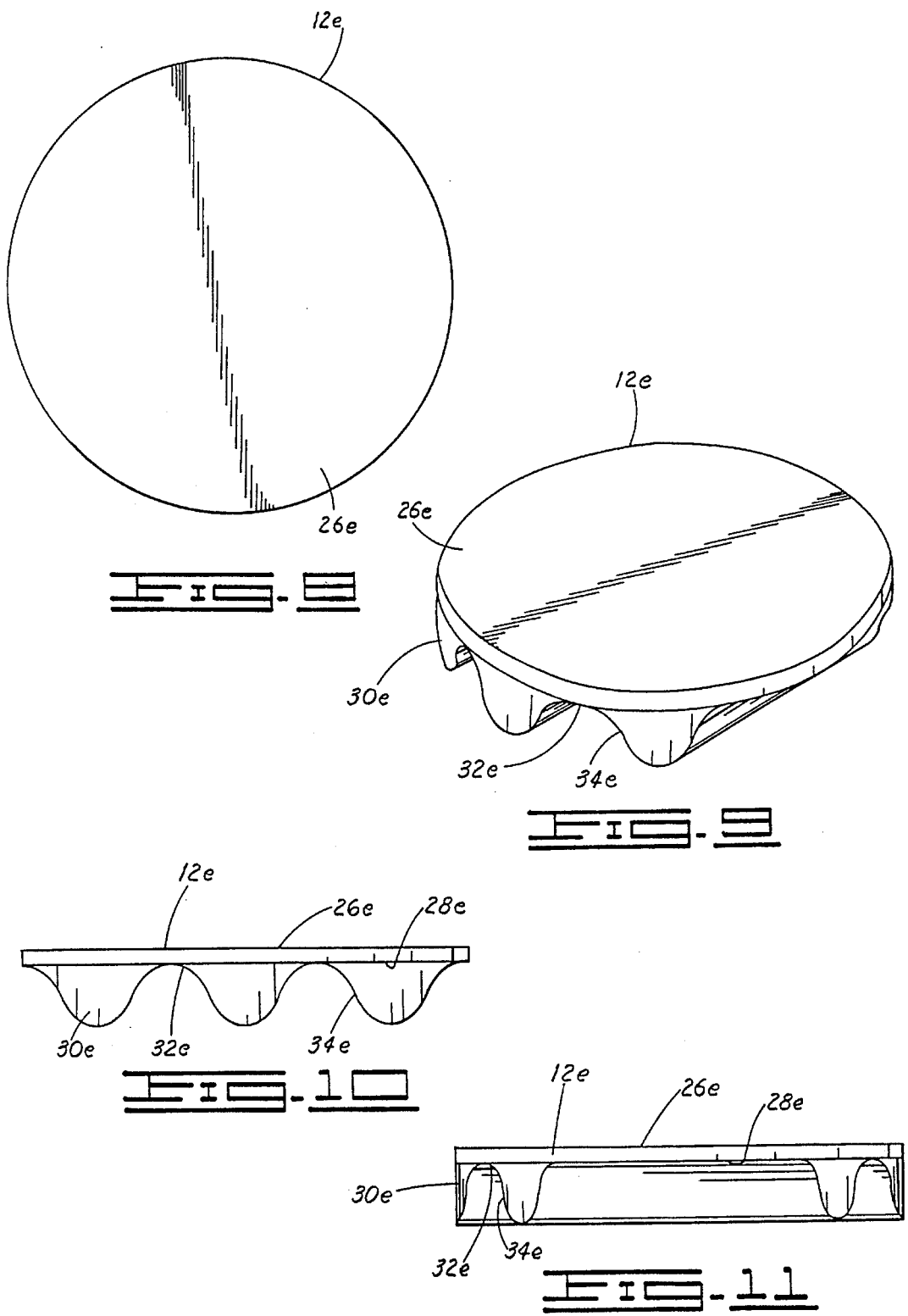

TRUCK BED LINER ANTI-SKID DEVICE

RELATED REFERENCES

This application is a continuation of U.S. Ser. No. 07/796,092, filed Nov. 20, 1991, entitled, "TRUCK BED LINER ANTI-SKID DEVICE", and now abandoned which is a continuation-in-part of U.S. Ser. No. 07/740,976, filed, Aug. 6, 1991, entitled, "TRUCK BEDLINER ANTI-SKID DEVICE" and now abandoned.

BACKGROUND OF THE INVENTION

FIELD OF THE INVENTION

The present invention relates generally to anti-skid devices for use with a truck bed liner, having a plurality of liner ribs forming a plurality of rib recesses for preventing movement of cargo and, more particularly, to an anti-skid device formed of an anti-skid material and having at least two device ribs formed on a portion thereof, forming device rib recesses, the device ribs being disposed in the liner rib recesses and a portion of cargo being placed on the anti-skid device whereby the anti-skid device grippingly engages the truck bed liner and the cargo for preventing movement of the cargo.

BRIEF DESCRIPTION OF THE DRAWINGS

FIG. 1 is a top plan view of an anti-skid assembly constructed in accordance with the present invention.

FIG. 3 is a front elevational view of the anti-skid assembly of FIG. 1.

FIG. 4 is a side elevational view of the anti-skid assembly of FIG. 1.

FIG. 2 is a perspective view of the anti-skid assembly of FIG. 1.

FIG. 5 is a diagrammatic view showing four anti-skid devices placed on a truck bed liner with cargo (shown in dashed lines) supported on the anti-skid devices, the four anti-skid devices comprising the anti-skid assembly in this embodiment.

FIG. 6 is a bottom plan view of the anti-skid device of FIG. 1.

FIG. 8 is a top elevational view of another modified anti-skid assembly.

FIG. 9 is a perspective view of a modified anti-skid assembly of FIG. 7.

FIG. 10 is a front elevational view of the modified anti-skid assembly of FIG. 7.

FIG. 11 is a side elevational view of the modified anti-skid assembly of FIG. 7.

DESCRIPTION OF THE PREFERRED EMBODIMENTS

Figure 7:
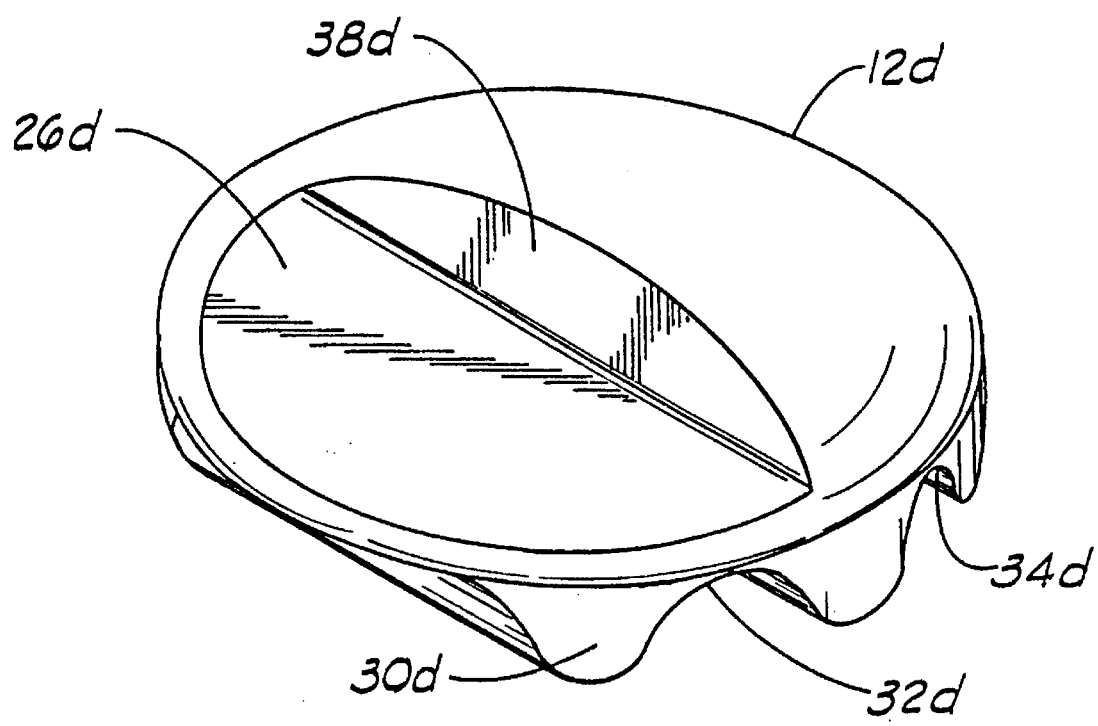
FIG. 7 is a perspective view of a modified anti-skid device.

Shown in FIGS. 1, 2, 3, 4 and 6 is an anti-skid assembly 10 comprising a single anti-skid device 12. The anti-skid assembly 10 and the anti-skid devices 12 are adapted to be used with a bed liner disposed in the bed of a pickup truck, a typical bed liner being shown in FIG. 5 and designated therein by the reference numeral 14 with the bed liner 14 being disposed in the bed of a pickup truck 16 (partially and diagrammatically shown in FIG. 5). The bed liner has an upper surface 18 (FIG. 5) and a plurality of liner ribs 20 are formed on the upper surface 18 of the bed liner 14 with each of the liner ribs 20 extending a distance upwardly from the upper surface 18 (only one of the liner ribs 20 being designated with a reference numeral in FIG. 5). The liner ribs 20 are spaced a distance apart and each pair of liner ribs 20 forms a liner rib recess 22 therebetween (only one of the liner rib recesses 22 being designated with a reference numeral in FIG. 5).

Bed liners such as the bed liner 14 are commercially available such as the bed liner sold under the mark DURA-LINER® by Durakon Industries.

Thus, a detailed description of the construction and operation of bed liners such as the bed liner 14 is not deemed necessary herein.

Bed liners such as the bed liner 14 generally cover the bed of a pickup truck such as the pickup truck 16 to protect the pickup truck from scratches and dents. Bed liners such as the bed liner 14 also enhance the appearance of the pickup truck such as the pickup truck 16 and increase the resale value of the pickup truck such as the pickup truck 16. However, the supporting surface of bed liners such as the bed liner 14 formed by the liner ribs 20 is slick or slippery and, when cargo 24 (an outline of a typical cargo being shown in dashed lines in FIG. 5 and designated herein with the reference numeral 24) is placed on the bed liner such as the bed liner 14, the cargo 24 has a tendency to shift or move during movement of the pickup truck such as the pickup truck 16.

The anti-skid assembly 10 of the present invention is adapted to be disposed on the bed liner 14 so that a portion of the cargo 24 to be shipped by the pickup truck 16 is disposed on the anti-skid assembly 10. The anti-skid assembly 10 grippingly engages the cargo 24 and the bed liner 14 for substantially preventing movement of the cargo 24 during movement of the pickup truck 16 or transportation of the cargo 24.

The anti-skid device 12 permits full use of the bed liner 14 for ease in cargo loading and unloading. The anti-skid device 12 also provides protection against cargo load shifting during the transportation. The anti-skid device 12 is small (compact in size) for easy storage and increases safety in cargo transportation by preventing or substantially preventing movement of the cargo. The anti-skid device 12 is constructed to complement the appearance of the bed liner 14. The anti-skid device 12 is constructed to accommodate a variety of sizes of cargo.

The anti-skid device 12 is constructed of an anti-skid material. More particularly, the anti-skid device 12 is a single piece construction, constructed of a dense, pliable, friction engagable material such as an elastomeric material. In one preferred embodiment, the anti-skid device 12 is constructed of a co-polymer duro rubber, 75A Stock 2269-70, commercially available from Morton Rubber Co. of Fort Worth, Tex. The anti-skid material preferably is a copolymer special blend rubber with nitrile and with an ultraviolet inhibitor. This material has a density range between about 35 durometer and about 80 durometer with the preferred density being about 59 durometer. The anti-skid device 12 may be pressure molded where the mold is opened, the material inserted, the mold closed, the mold heated and the material cured and removed. In the alternative, the anti-skid device 12 may be injection molded where the injection ports are filled with pressurized, heated material and the heated material is injected into the mold, cured and then removed.

As shown in FIGS. 1-4, the anti-skid device 12 has an upper surface 26 and a lower surface 28. Three device ribs 30 are formed on the lower surface 28 with each of the device ribs 30 extending a distance from the lower surface 28. The individual device ribs are designated with the specific reference numerals 30a, 30b and 30c in FIGS. 2, 3 and 4. The device ribs 30 are spaced a distance apart forming two device recesses 32 (the individual device recesses being designated in FIG. 2 and 3 by the specific reference numerals 32a and 32b).

The device recesses 32 each are sized to accommodate a portion of one of the liner ribs 20 when the anti-skid device 12 is disposed on the bed liner 14. The device recesses 32 are shaped to form an outer peripheral surface 34 extending about each of the device recesses 32 (the individual outer peripheral surfaces being designated in FIGS. 2 and 3 by the specific referenced numerals 34a and 34b). The device recesses 32 are shaped so that the outer peripheral surface 34 of each of the device recesses 32 substantially conforms to the shape of one of the liner ribs 20. Thus, when the anti-skid device 12 is disposed on the bed liner 14, a portion of one of the liner ribs 20 is disposed in each of the device recesses 32 with the outer peripheral surface 34 engaging substantially the entire outer peripheral surface formed by one of the liner ribs 20 to maximize the contact area between the device recesses 32 and the liner ribs 20.

A raised portion 36, constructed of the anti-skid material described before, is formed on a portion of the upper surface 26 of the anti-skid device 12. The raised portion 36 extends a distance upwardly from the upper surface 26 of the anti-skid device 12. The upper surface 26 of the anti-skid device 12 is substantially flat and disposed in a horizontally extending plane. A wall 38 is formed on the raised portion 36 with the wall 38 extending about perpendicularly upwardly from the upper surface 26 of the anti-skid device 12. In a preferred form, the raised portion 36 is formed integrally to provide a one piece construction of the anti-skid device 12.

The device ribs 30 extend perpendicular to wall 38 of the raised portion 36. Shown in FIG. 7 is a modified anti-skid device 12d which is constructed exactly like the anti-skid device 12 shown in FIGS. 1, 2, 3, 4 and 5, except the device ribs 30d extend parallel to the wall 38 of the raised portion 36.

It is contemplated that the anti-skid assembly 10 would include two or more anti-skid devices 12. In operation, as illustrated in FIG. 5, each of the anti-skid devices 12 is disposed on a portion of the upper surface 18 of the bed liner 14. More particularly, and as shown in FIG. 5, the anti-skid assembly 10 includes four anti-skid devices 12 or, more particularly two anti-skid devices 12 and two anti-skid devices 12d. Each of the anti-skid devices 12 and 12d is disposed on the upper surface 18 of the bed liner 14 and positioned so that a portion of the liner rib 20 is disposed in each of the device recesses 32 or 32d with the outer peripheral surface 34 or 34d engaging substantially the entire outer peripheral surface of one of the liner ribs 20 portion disposed in the device recess 32 or 32d for maximizing the gripping engagement between the anti-skid device 12 or 12d and the bed liner 14.

As shown in FIG. 5, the anti-skid devices 12 and 12d are positioned with respect to the cargo 24 so that a portion of one of the anti-skid devices 12d engages a portion of one side of the cargo 24, a portion of one of the anti-skid devices 12d engages a portion of the opposite side of the cargo 24, a portion of one of the anti-skid devices 12 engages a portion of one of the ends of the cargo 24 and a portion of one of the anti-skid devices 12 engages a portion of the opposite end of the cargo 24. More particularly, the cargo 24 is positioned on the anti-skid devices 12 and 12d so that a portion of the cargo 24 engages and rests upon the upper surfaces 26 and 26d of each of the anti-skid devices 12 and 12d with a portion of the cargo 24 engaging the wall 38 or 38d on each of the anti-skid devices 12 and 12d.

In this position, the anti-skid devices 12 and 12d each grippingly engage the bed liner 14 and each of the anti-skid devices 12 and 12d grippingly engage a portion of the cargo 24 for substantially preventing movement of the cargo 24 during transportation.

EMBODIMENT OF FIGS. 8, 9, 10 AND 11

Shown in FIGS. 8, 9, 10 and 11 is a modified anti-skid device 12e. The anti-skid device 12e is constructed exactly like the anti-skid device 12 described in detail before except the anti-skid device 12e includes a substantially flat upper surface 26e and a lower surface 28e. The upper surface 26e is formed without a raised portion thereon such as the raised portion 36 described before with respect to the anti-skid device 12. The anti-skid device includes three device ribs 30e forming two device recesses 32e exactly like the device ribs 30 and device recesses 32 described before with the device recesses 32e being shaped to form an outer peripheral surface 34e extending about each of the device recesses 32e.

The anti-skid device 12e will operate exactly like the anti-skid device 12 described before, except the cargo 24 will not engage a wall like the wall 38 formed in the anti-skid device 12.

Changes may be made in a construction in the operation of the various components, elements and assemblies as described herein or in the steps or the sequence of steps of the methods described herein without departing from the spirit and scope of the invention as defined in the following claims.

What is claimed is:

1. A method for storing cargo in a bed of a truck when a bed liner is disposed in the bed of the truck with the bed liner having an upper surface with a plurality of liner ribs, each liner rib extending a distance upwardly from the upper surface of the bed liner, the liner ribs being spaced a distance apart forming a liner recess between each adjacent pair of liner ribs, the method comprising the steps of:

providing an anti-skid device constructed of an anti-skid material and having an upper surface, a lower surface, and at least two device recesses formed in the lower surface of the anti-skid device, each device recess being sized to accommodate a portion of one of the liner ribs of the bed liner and the upper surface of the anti-skid device being adapted to accommodate a portion of the cargo to be stored in the bed of the truck;

positioning the anti-skid device on the bed liner with a portion of one of the liner ribs being disposed in each of the device recesses; and positioning the cargo in the bed of the truck with a portion of the cargo being disposed on the upper surface of the anti-skid device, the anti-skid device frictionally engaging a portion of the bed liner and frictionally engaging a portion of the cargo for substantially preventing movement of the cargo during transportation.

2. A method for storing cargo in a bed of a truck when a bed liner is disposed in the bed of the truck with the bed liner having an upper surface with a plurality of liner ribs, each liner rib extending a distance upwardly from the upper surface of the bed liner, the liner ribs being spaced a distance apart forming a liner recess between each adjacent pair of liner ribs, the method comprising:

providing a plurality of anti-skid devices with each anti-skid device being constructed of an anti-skid material and having an upper surface, a lower surface, and at least two device recesses formed in the lower surface of each of the anti-skid devices, each device recess on each anti-skid device being sized to accommodate a portion of one of the liner ribs of the bed liner and the upper surface of each anti-skid device being adapted to accommodate a portion of the cargo to be stored in the bed of the truck;

positioning each anti-skid device on the bed liner with a portion of one of the liner ribs being disposed in each of the device recesses in each anti-skid device; and positioning the cargo in the bed of the truck with a portion of the cargo being disposed on the upper surface of each of the anti-skid devices, each of the anti-skid devices frictionally engaging a portion of the bed liner and frictionally engaging a portion of the cargo for substantially preventing movement of the cargo during transportation.

* * * * *